(12) United States Patent
Bulat-Ag

(10) Patent No.: US 12,033,012 B2
(45) Date of Patent: Jul. 9, 2024

(54) IMAGE PROCESSING APPARATUS AND IMAGE PROCESSING METHOD CAPABLE OF GENERATING 2D BARCODE USING WORDS CONSTITUTING TEXT IN DOCUMENT IMAGE, INPUT IDENTIFICATION INFORMATION, AND PREDETERMINED SIGN AND ASSIGNING GENERATED 2D BARCODE TO DOCUMENT IMAGE

(71) Applicant: KYOCERA Document Solutions Inc., Osaka (JP)

(72) Inventor: Peter James Bulat-Ag, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 191 days.

(21) Appl. No.: 17/694,924

(22) Filed: Mar. 15, 2022

(65) Prior Publication Data
US 2022/0309303 A1    Sep. 29, 2022

(30) Foreign Application Priority Data

Mar. 25, 2021 (JP) ................. 2021-051965

(51) Int. Cl.
*G06K 19/06* (2006.01)
*G06K 1/12* (2006.01)
*H04N 1/32* (2006.01)

(52) U.S. Cl.
CPC ....... *G06K 19/06037* (2013.01); *G06K 1/121* (2013.01); *G06K 19/06056* (2013.01);
(Continued)

(58) Field of Classification Search
CPC ............ G06K 19/06037; G06K 1/121; G06K 19/06056; G06K 19/06103; H04N 1/32133; H04N 2201/327; H04N 2201/3271
See application file for complete search history.

(56) References Cited

U.S. PATENT DOCUMENTS

2009/0284775 A1    11/2009  Muramatsu
2013/0026239 A1    1/2013   Sakahashi et al.
(Continued)

FOREIGN PATENT DOCUMENTS

JP    2009278361 A    11/2009
JP    2013025782 A    2/2013

*Primary Examiner* — Sonji N Johnson
(74) *Attorney, Agent, or Firm* — IP Business Solutions, LLC.

(57) ABSTRACT

In an image processing apparatus, upon input of first identification information through an identification information input device and a first document image through an image input device, a control device functioning as a controller recognizes a first text in the first document image, extracts a plurality of words constituting the first text, selects first symbols or characters from the first identification information in a predetermined first order, selects first words from the plurality of words in a predetermined second order, inserts, upon each selection of the first symbol or character and the first word, a predetermined sign and the first symbol or character between the first word and the next first word to generate a first character string, converts the first character string to a first 2D barcode, and assigns the first 2D barcode to the first document image. An output device outputs the first 2D barcode-assigned first document image.

9 Claims, 6 Drawing Sheets

(52) U.S. Cl.
CPC ... *H04N 1/32133* (2013.01); *H04N 2201/327* (2013.01); *H04N 2201/3271* (2013.01)

(56) References Cited

U.S. PATENT DOCUMENTS

2015/0181052 A1* 6/2015 Yamamoto ........... H04N 1/0083
358/474
2020/0265279 A1* 8/2020 Geering ........... G06K 19/06103

* cited by examiner

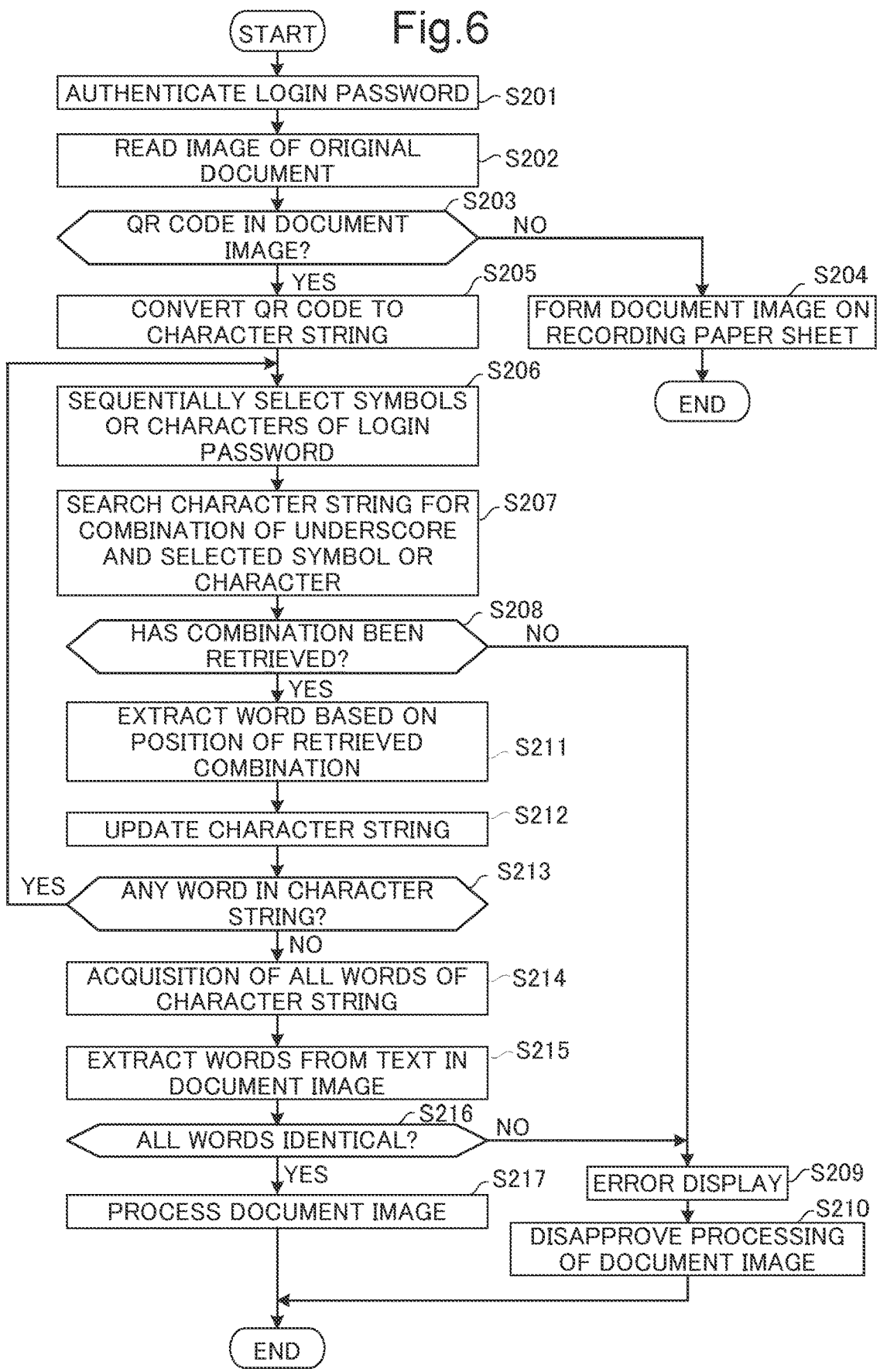

IMAGE PROCESSING APPARATUS AND IMAGE PROCESSING METHOD CAPABLE OF GENERATING 2D BARCODE USING WORDS CONSTITUTING TEXT IN DOCUMENT IMAGE, INPUT IDENTIFICATION INFORMATION, AND PREDETERMINED SIGN AND ASSIGNING GENERATED 2D BARCODE TO DOCUMENT IMAGE

INCORPORATION BY REFERENCE

This application claims priority to Japanese Patent Application No. 2021-051965 filed on 25 Mar. 2021, the entire contents of which are incorporated by reference herein.

BACKGROUND

The present disclosure relates to image processing methods and image processing systems and particularly relates to a technique for increasing the reliability and security of a text in a document image.

Generally, a technique is known for increasing the reliability and security of an image or so on by protecting the image or so on using a password. However, there is fear of damage caused by cracking (breaking), leakage or so on of the password.

A technique is also known for increasing the reliability and security of the contents of a paper document by embedding a ground tint as code information into the paper document to restrict copying, take-out and so on of the paper document. However, devices capable of generating and reading ground tints are not yet widespread and, therefore, ground tints are difficult to apply to various image processing systems.

As an alternative to the above technique, there is known a technique for applying as code information a more common QR code (registered trademark) (an example of a 2D barcode). For example, there is known a computer that encodes information to create a QR code, tentatively places an image into the QR code, calculates the error rate of the QR code, and adjusts the layout and size of the image so that the error rate lowers to a threshold value or less. This enables provision of a QR code with which humans can recognize or infer the contents of the information.

SUMMARY

A technique improved over the aforementioned technique is proposed as one aspect of the present disclosure.

An image processing apparatus according to an aspect of the present disclosure includes an image input device, an identification information input device, a control device, and an output device. A document image is input through the image input device. Identification information consisting of an array of symbols or characters is input through the identification information input device. The control device includes a processor and functions as a controller through the processor executing a control program. When first identification information is input through the identification information input device and a first document image is input through the image input device, the controller executes assignment processing for: recognizing a first text in the first document image and extracting a plurality of words constituting the first text; sequentially selecting first symbols or first characters from the first identification information in a predetermined first order; sequentially selecting first words from the plurality of words in a predetermined second order; inserting, upon each selection of the first symbol or first character and the first word, a predetermined sign and the first symbol or first character between the first word and the next first word to generate a first character string; converting the first character string to a first 2D barcode; and assigning the first 2D barcode to the first document image. The output device outputs the first document image assigned the first 2D barcode.

An image processing method according to another aspect of the present disclosure includes the steps of: inputting first identification information; inputting a first document image; recognizing a first text in the first document image and extracting a plurality of words constituting the first text; sequentially selecting first symbols or first characters from the first identification information in a predetermined first order, sequentially selecting first words from the plurality of words in a predetermined second order, and inserting, upon each selection of the first symbol or first character and the first word, a predetermined sign and the first symbol or first character between the first word and the next first word to generate a first character string; converting the first character string to a first 2D barcode; assigning the first 2D barcode to the first document image; and outputting the first document image assigned the first 2D barcode.

BRIEF DESCRIPTION OF THE DRAWINGS

FIG. 6 is a flowchart showing approval processing.

DETAILED DESCRIPTION

Hereinafter, a description will be given of an embodiment of the present disclosure with reference to the drawings.

Figure 1:
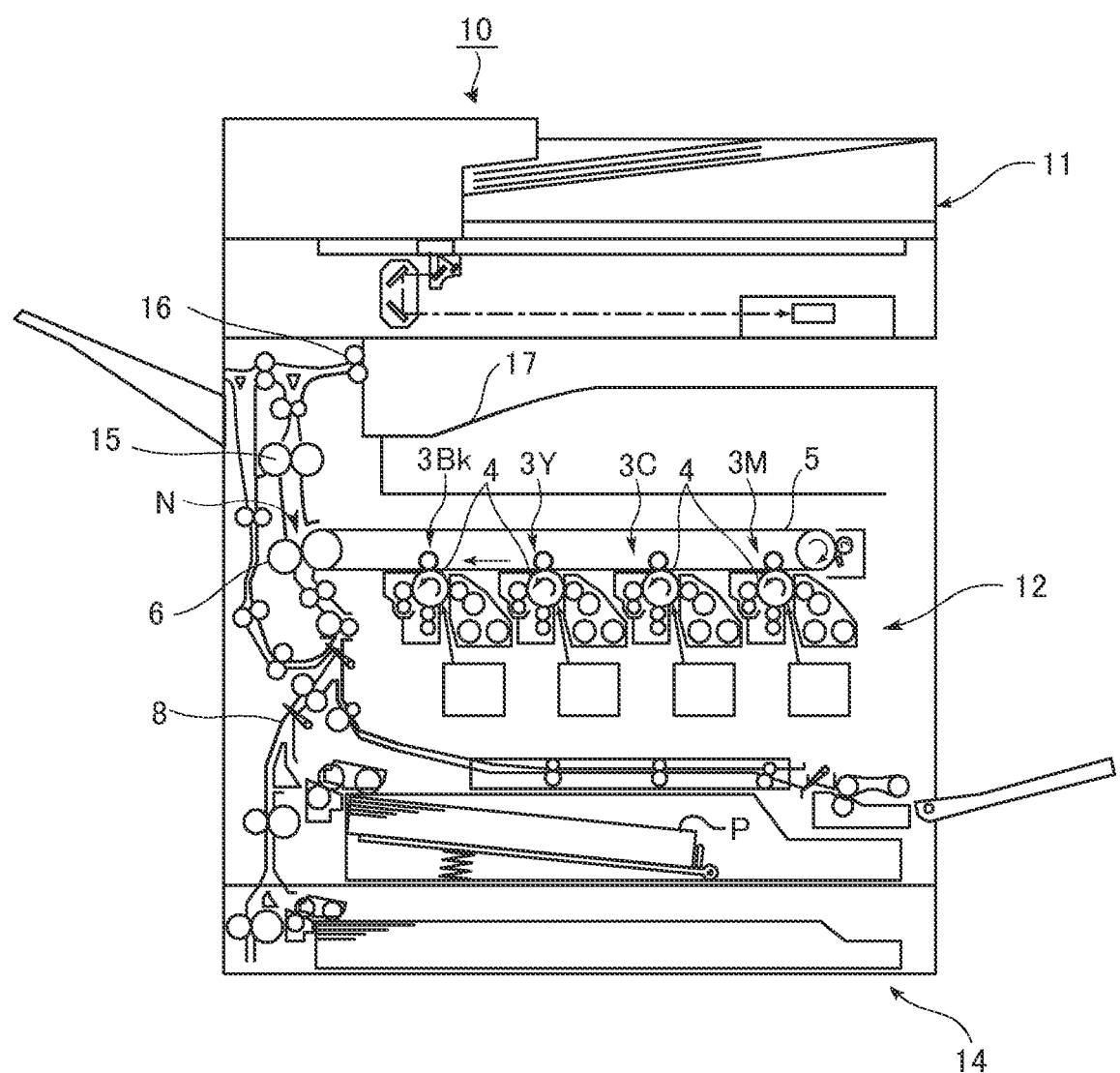
FIG. 1 is a cross-sectional view showing an image forming apparatus to which an image processing method according to one embodiment of the present disclosure is applied.

FIG. 1 is a cross-sectional view showing an image forming apparatus 10 to which an image processing method according to an embodiment of the present disclosure is applied. As shown in FIG. 1, the image forming apparatus 10 is, for example, a multifunction peripheral (MFP) having multiple functions, including a copy function, a print function, and a facsimile function. The image forming apparatus 10 includes an image reading device 11, an image forming device 12, and a fixing device 15.

The image reading device 11 includes an image pickup device capable of optically reading an image of an original document. The image reading device 11 converts an analog signal of the image pickup device to a digital signal to generate image data representing the document image. The image reading device 11 is an example of the image input device defined in CLAIMS.

The image forming device 12 forms an image represented by the image data on a recording paper sheet. The image forming device 12 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feed device 14 via a conveyance path 8. The image forming device 12 is an example of the output device defined in CLAIMS.

The fixing device 15 applies heat and pressure to the recording paper sheet P with the toner image transferred thereto to fix the toner image on the recording paper sheet P by heat and pressure. The recording paper sheet P on which the toner image is fixed is discharged through an ejection roller 16 to a sheet output tray 17.

Figure 2:
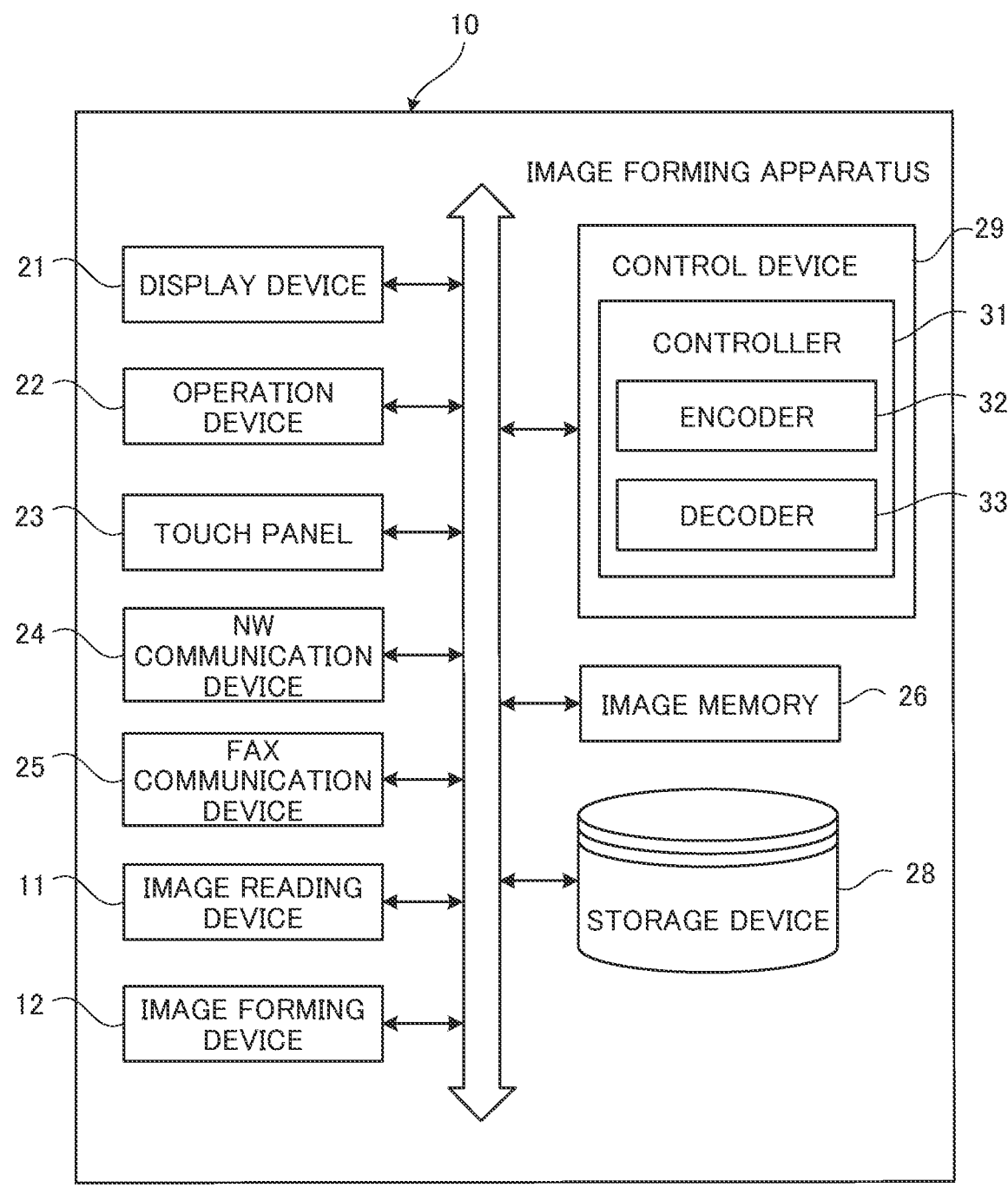
FIG. 2 is a block diagram showing an essential internal configuration of the image forming apparatus.

FIG. 2 is a block diagram showing an essential internal configuration of the image forming apparatus 10. As shown in FIG. 2, the image forming apparatus 10 includes the image reading device 11, the image forming device 12, a display device 21, an operation device 22, a touch panel 23, a network communication device (NW communication device) 24, a facsimile communication device (FAX communication device) 25, an image memory 26, a storage device 28, and a control device 29. These components are capable of data or signal transfer via a bus among them.

The display device 21 is formed of a liquid crystal display (LCD), an organic EL (organic light-emitting diode (OLED)) display or the like. The operation device 22 includes physical keys, including numeric keys, an Enter key, and a Start key.

A touch panel 23 is disposed over the screen of the display device 21. The touch panel 23 is a touch panel of a resistive film system, a capacitance system or any other system. The touch panel 23 detects a touch on the touch panel 23 with a user's finger or the like, together with a point of the touch, and outputs a detection signal indicating the coordinate of the point of touch to a controller 31 of the control device 29 and so on.

The network communication device (NW communication device) 24 is a communication interface including a communication module, such as a LAN chip, and is connected to other terminal devices via a wired LAN or a wireless LAN. The network communication device 24 sends and receives data to and from the other terminal devices.

The facsimile communication device (FAX communication device) 25 sends and receives image data representing an image via the network to and from other image forming apparatuses, other facsimile devices, and so on.

The image memory 26 stores image data representing a document image generated by the image reading device 11.

The storage device 28 is a large storage device, such as an SSD (solid state drive) or an HDD (hard disk drive). The storage device 28 stores various types of application programs, various types of data, and so on.

The control device 29 is made up of a processor, a RAM (random access memory), a ROM (read only memory), and so on. The processor is, for example, a CPU (central processing unit), an ASIC (application specific integrated circuit) or an MPU (micro processing unit). When a control program stored in the ROM or the storage device 28 is executed by the above processor, the control device 29 functions as a controller 31.

The controller 31 governs the overall operation control of the image forming apparatus 10. The control device 29 is connected to the image reading device 11, the image forming device 12, the display device 21, the operation device 22, the touch panel 23, the network communication device 24, the facsimile communication device 25, the image memory 26, the storage device 28, and so on. The controller 31 performs operation control on each of the above components and signal or data transfer to and from each of the components.

The controller 31 serves as a processor that executes various types of processing necessary for image formation by the image forming apparatus 10. The controller 31 accepts, based on a detection signal output from the touch panel 23 or operation on a physical key of the operation device 22, an operation instruction input by a user. The controller 31 has the function of controlling the display operation of the display device 21 and the function of controlling the communication operations of the network communication device 24 and the facsimile communication device 25.

Furthermore, the controller 31 functions as an encoder 32 that generates a QR code and as a decoder 33 that decodes the QR code.

When in the image forming apparatus 10 having the above structure, for example, the user places an original document in the image reading device 11 and operates the operation device 22 or the touch panel 23 to input an instruction for copying, the controller 31 follows the instruction to allow the image reading device 11 to read an image of the original document and allow the image memory 26 to store image data representing the document image. The controller 31 allows the image data to be input from the image memory 26 to the image forming device 12 and allows the image forming device 12 to form the document image represented by the image data on a recording paper sheet.

In this embodiment, the controller 31 assigns a QR code to the document image (synthesizes the QR code with the document image). Thus, the reliability and security of the document image is increased. Specifically, the controller 31 recognizes a text in a document image on a page-by-page basis and extracts a plurality of words constituting the recognized text. The controller 31 acquires a login password (an example of the first identification information) input by the user in logging in to the image forming apparatus 10 and sequentially selects symbols or characters constituting the login password in a predetermined first order (for example, selects the symbols or characters constituting the login password one by one in order from the initial symbol or character in a direction of symbol or character sequence). Furthermore, the controller 31 sequentially selects the extracted words in a predetermined second order (for example, selects the extracted plurality of words word by word in order of sequence from the initial word), inserts, upon each selection of the symbol or character and the word, a predetermined underline sign (for example, an underscore) and the selected symbol or character between the selected word and the next word to generate a character string, converts the finally generated character string to a 2D code (for example, a QR code; hereinafter the description in this embodiment will be given using the QR code as an example), and assigns the obtained QR code to the document image (synthesizes the QR code with the document image).

Figure 3:
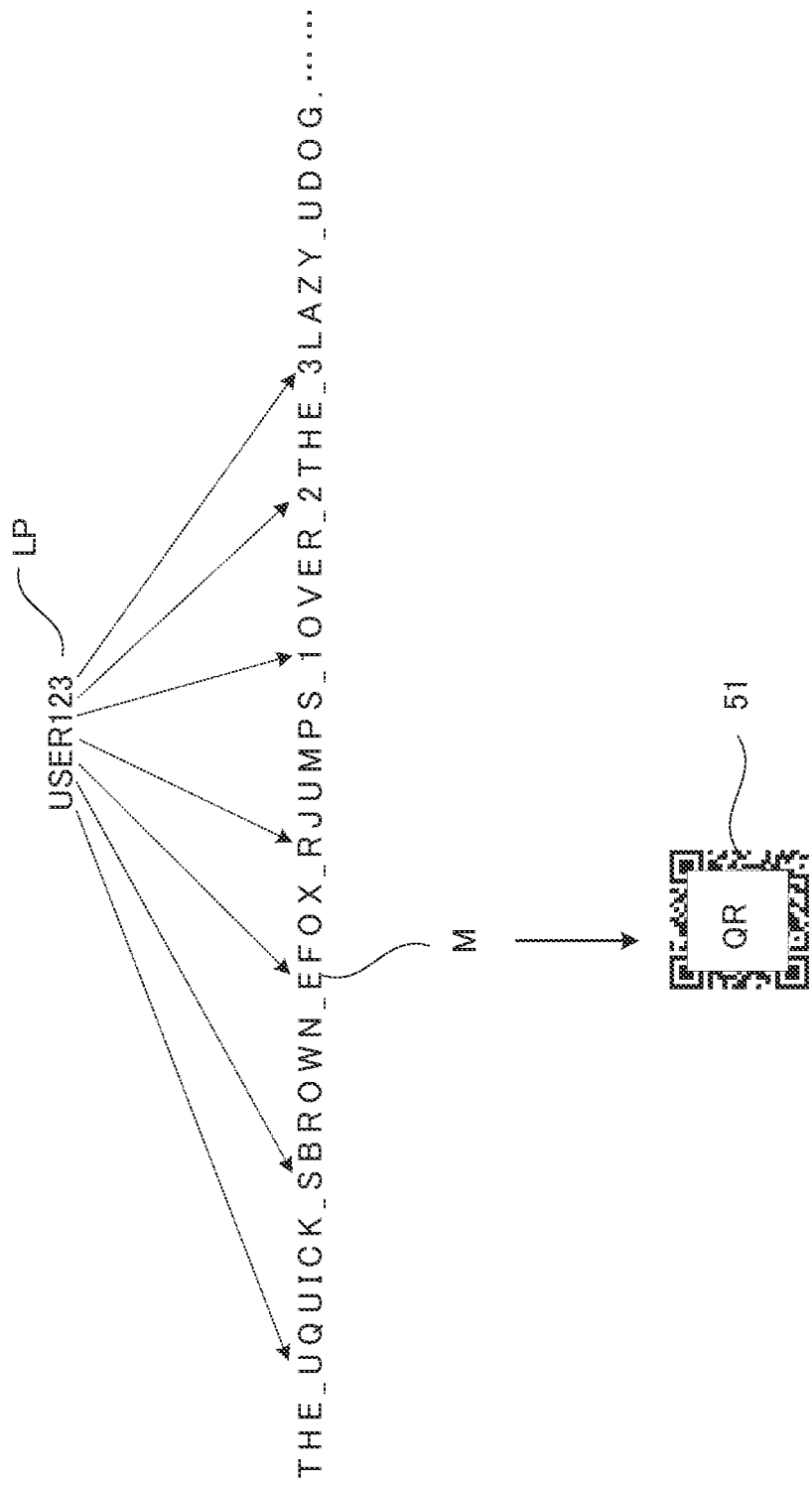
FIG. 3 is a view showing respective examples of a text in a document image, a login password, a generated character string, and a QR code.

For example, when, as shown in FIG. 3, recognizing a text TX in a document image and extracting the words "The quick brown fox jumps . . . " constituting the text TX, the controller 31 sequentially selects the symbols or characters of an input login password "user123" one by one. Furthermore, the controller 31 sequentially selects the extracted words "The", "quick", "brown", "fox", "jumps" . . . one by one and inserts, upon each selection, an underscore and one symbol or character sequentially selected from "user123" between the selected word and the next word. In this manner, the controller 31 finally generates a character string M "The_uquick_sbrown_efox_rjumps . . . " and converts the character string M to a QR code 51.

In executing processing of a document image, such as copying or facsimile transmission of the document image, the controller 31 detects a QR code assigned to the document image, converts the detected QR code to a character string, and extracts a plurality of words from the obtained character string based on underscores in the character string and symbols or characters in an input login password (an example of the second identification information). The controller 31 recognizes a text in the document image, extracts a plurality of words constituting the text, and checks the respective words extracted from the character string against the respective words constituting the text. When the respective words extracted from the character string are identical with the corresponding respective words of the text, the controller 31 approves the processing of the document image.

Since, as thus far described, the controller 31 generates, for each page of a document image, a QR code based on the input login password and the respective words of the text in the document image, the QR code to be generated changes in content with every page of the document image. Thus, the reliability and security of the text in the document image can be increased.

Figure 4:
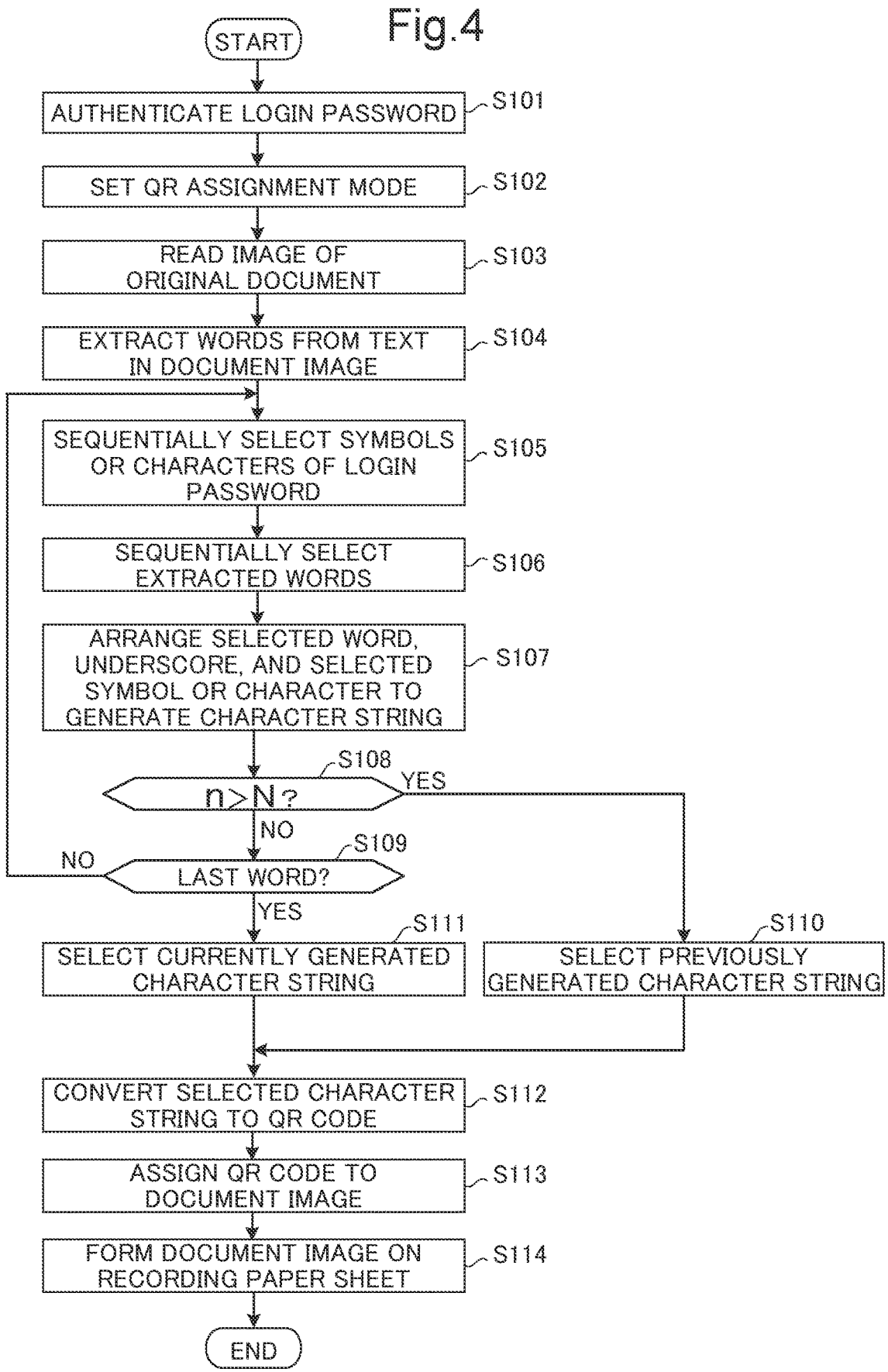
FIG. 4 is a flowchart showing QR code assignment processing.

Next, a detailed description will be given of QR code assignment processing for assigning a QR code to an image of an original document with reference to the flowchart shown in FIG. 4.

For example, a user places an original document in the image reading device 11 and operates a GUI or the like displayed on the screen of the display device 21 through the touch panel 23 or the operation device 22 to input a login password LP (an example of the first identification information) of the user and input an instruction to generate and assign a QR code. The touch panel 23 and the operation device 22 are examples of the identification information input device defined in CLAIMS.

The controller 31 determines whether or not the input login password LP equals any one of login passwords of a plurality of users in a login control table stored in the storage device 28. When determining that the login passwords equal, the controller 31 authenticates the input login password LP and allows the user having input the login password LP to log in to the image forming apparatus 10 (step S101).

After the processing in step S101, the controller 31 sets the image forming apparatus 10 to a QR code assignment mode in accordance with the instruction to generate and assign a QR code (step S102) and executes a copy job to allow the image reading device 11 to read an image of a page of the original document and allow the image memory 26 to store image data representing the document image (step S103).

The controller 31 analyzes the image data in the image memory 26 based on an existing OCR (optical character recognition) function to recognize the text TX in the document image and extract a plurality of words constituting the recognized text TX (step S104). For example, in the case where the text TX is an English text, spaces are inserted between words. Therefore, the controller 31 extracts the words by distinguishing one word from another by the spaces between the words. In the case where the text TX is a text in Japanese or any other language having no delimiter, the controller 31 allows the storage device 28 to previously store a word dictionary and extracts the words constituting the text TX by reference to the word dictionary on the basis of each word in the word dictionary.

After the processing in step S104, the controller 31 selects the initial symbol or character of the input login password LP (step S105) and selects the initial word of the text TX from the words extracted in step S104 (step S106). The controller 31 generates a character string M in which the selected word, an underscore, and the selected initial symbol or character are arranged in this order (step S107).

After the processing in step S107, the controller 31 counts the number n of characters of the generated character string M, determines whether or not the number n of characters of the character string M exceeds a predetermined maximum number N of characters of a character string to be converted to a QR code (step S108), and determines whether or not the last word of the text TX has been selected from the words extracted in step S104 (step S109).

When determining that the number n of characters of the character string M does not exceed the maximum number N of characters ("No" in step S108) and subsequently determining that the last word has not been selected from the words extracted in step S104 ("No" in step S109), the controller 31 goes back to the processing in step S105. The controller 31 selects the second symbol or character of the input login password LP (step S105), selects the second word of the text TX from the words extracted in step S104 (step S106), arranges the selected second word, an underscore, and the selected second symbol or character in this order, and adds them to the end of the character string M generated in the previous step S107, thus updating the character string M (step S107). When determining that the number n of characters of the updated character string M does not exceed the maximum number N of characters ("No" in step S108) and subsequently determining that the last word has not been selected from the words extracted in step S104 ("No" in step S109), the controller 31 repeats the processing from step S105 to step S107.

Thereafter, in the same manner, so long as the number n of characters of the updated character string M does not exceed the maximum number N of characters and the last word has not been selected from the words extracted in step S104, the controller 31 selects the next symbol or character of the input login password LP, selects the next word from the words extracted in step S104, arranges the selected next word, an underscore, and the selected next symbol or character in this order, and adds them to the end of the character string M generated in the previous step S107, thus updating the character string M.

Thus, for example, as shown in FIG. 3, an underscore and one symbol or character of "user123" are sequentially inserted between each adjacent pair of words of "The quick brown fox jumps . . . ", so that a character string M "The uquick_sbrown_efox_rjumps . . . " is finally generated.

With each insertion of an underscore and one symbol or character of the login password LP between each adjacent pair of words of the text TX, the number n of characters of the character string M increases by "(the number of characters of words)+2".

The controller 31 makes a cyclically repetitive, sequential selection of symbols or characters of the login password LP. To be more specific, the controller 31 repeats processing for selecting symbols or characters of the login password LP one by one in order from the initial symbol or character and, after the selection of the last symbol or character, selecting the symbols or characters one by one in order from the initial symbol or character again.

In this embodiment, it is assumed that the maximum number N of characters of a character string to be converted to a QR code is "4296". For example, when the average number of characters of a text per page of a document image is "3500", the number of underscores and symbols or characters of a login password that can be repeatedly added (in a biliteral form of an underscore and a symbol or character) to the QR code is "796" obtained by subtracting "3500" from "4296". In other words, the controller 31 can insert, between words of the text, a pair of an underscore and a symbol or character of the login password at maximum 796/2 (=398) times.

When, by an increase in the number n of characters of the character string M, the controller 31 determines that the number n of characters exceeds the maximum number N of characters ("Yes" in step S108), it selects the previous character string M which is a character string M before being updated in step S107. In other words, the controller 31 selects the character string M consisting of a number n of characters equal to or less than the maximum number N of characters (step S110). This means that the number n of characters of the character string M has reached the maximum number N of characters before all the words of the text TX in the document image are selected. Therefore, the character string M does not contain all the words constituting the text TX, but lacks at least one word from somewhere in the sequence of words of the text TX.

On the other hand, when determining that the number n of characters of the character string M does not exceed the maximum number N of characters ("No" in step S108) and subsequently determining that the last word has been selected from the words extracted in step S104 ("Yes" in step S109), the controller 31 selects the character string M updated in step S107. In other words, the controller 31 selects the character string M consisting of a number n of characters equal to or less than the maximum number N of characters (step S111). In this case, since all the words consisting the text TX in the document image are selected, the character string M contains all the words of the text TX.

The controller 31 allows the encoder 32 to convert the character string M selected in step S110 or step S111 to a QR code (step S112) and processes the image data stored in the image memory 26 and representing the document image to assign the generated QR code to the document image (synthesize the QR code with the document image) (step S113).

Figure 5:
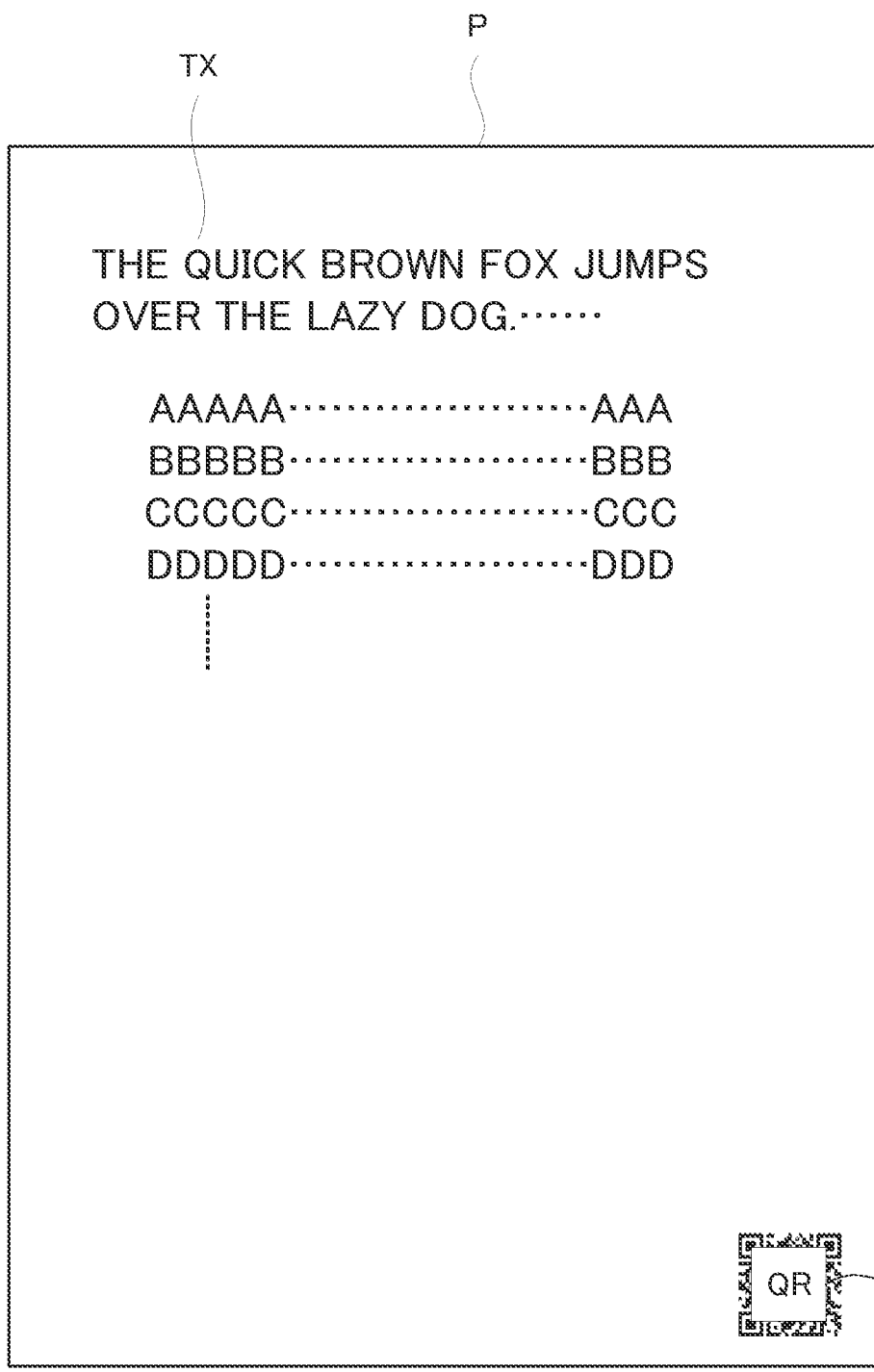
FIG. 5 is a view showing a recording paper sheet on which a document image assigned a QR code is formed.

After the processing in step S113, the controller 31 allows the image data assigned the QR code and representing the document image to be input from the image memory 26 to the image forming device 12 and allows the image forming device 12 to form the document image on a recording paper sheet (step S114). Thus, as shown in FIG. 5, the text TX in the document image and the QR code 51 are formed on the recording paper sheet P.

Next, a detailed description will be given of approval processing for approving processing of a document image assigned a QR code with reference to the flowchart shown in FIG. 6.

For example, a user places an original document in the image reading device 11, operates a GUI or the like displayed on the screen of the display device 21 through the touch panel 23 to input a login password LP (an example of the second identification information) of the user, and operates the operation device 22 to input an instruction to execute a copy job. The login password LP input at this point in time is a new login password.

The controller 31 determines whether or not the input login password LP equals any one of the login passwords of the plurality of users in the login control table stored in the storage device 28. When determining that the login passwords equal, the controller 31 authenticates the input user's login password LP and allows the user having input the login password LP to log in to the image forming apparatus 10 (step S201).

The controller 31 executes a copy job in accordance with the instruction to execute a copy job, thus allows the image reading device 11 to read an image of a page of the original document, and allows the image memory 26 to store image data representing the document image (step S202).

The controller 31 determines, based on the image data stored in the image memory 26, whether or not a QR code is assigned to the document image (step S203). The controller 31 makes this determination, for example, using a pattern matching technique.

For example, when determining that no QR code is assigned to the document image ("No" in step S203), the controller 31 allows the image data representing the document image to be input from the image memory 26 to the image forming device 12 and allows the image forming device 12 to form the document image on a recording paper sheet (step S204). Therefore, when no QR code is assigned to the document image, normal copy processing is executed.

On the other hand, when determining that a QR code is assigned to the document image ("Yes" in step S203), the controller 31 allows the decoder 33 to decode the QR code and thus convert the QR code to a character string M (step S205).

The controller 31 selects the initial symbol or character of the input login password LP (step S206) and search the character string M for a combination of an underscore and the selected initial symbol or character by sequential check beginning with the leading character of the character string M (step S207).

When the combination of an underscore and the selected initial symbol or character is not retrieved from the character string M ("No" in step S208), the controller 31 allows the display device 21 to display an error message (step S209) and does not allow the copy job to be executed (step S210).

On the other hand, when the combination of an underscore and the selected initial symbol or character is retrieved from the character string M ("Yes" in step S208), the controller 31 extracts the initial word from the character string M based on the position of the combination of the underscore and the selected initial symbol or character in the character string M (step S211) and deletes the extracted word and the above combination from the character string M to update the character string M (step S212).

The controller 31 determines the presence of absence of any word in the updated character string M (step S213). When determining the presence of any word ("Yes" in step S213), the controller 31 selects the second symbol or character of the input login password LP (step S206) and searches the updated character string M for a combination of an underscore and the selected second symbol or character by sequential check beginning with the leading character of the updated character string M (step S207).

When the combination of an underscore and the selected second symbol or character is not retrieved from the character string M ("No" in step S208), the controller 31 allows the display device 21 to display an error message (step S209) and does not allow the copy job to be executed (step S210). On the other hand, when the above combination is retrieved from the character string M ("Yes" in step S208), the controller 31 extracts the second word from the character string M based on the position of the combination of the underscore and the selected second symbol or character in the character string M (step S211) and deletes the extracted word and the above combination from the character string M to update the character string M (step S212). After the processing in step S212, the controller 31 determines the presence of absence of any word in the updated character string M (step S213). When determining the presence of any word ("Yes" in step S213), the controller 31 repeats the processing from step S206 to step S213.

Thereafter, in the same manner, so long as any word is present in the updated character string M, the controller 31 selects the next symbol or character of the input login password LP. When the combination of an underscore and the selected next symbol or character is not retrieved from the character string M, the controller 31 allows the display device 21 to display an error message and does not allow the copy job to be executed. On the other hand, when the above combination is retrieved from the character string M, the controller 31 extracts the next word from the character string M based on the position of the combination of the underscore and the selected next symbol or character in the character string M and deletes the extracted word and the above combination from the character string M to update the character string M. The controller 31 makes a cyclically repetitive, sequential selection of symbols or characters of the input login password LP.

When in this manner the extraction of one word from the character string M based on the position of a combination of an underscore and one symbol or character of the login password LP in the character string M, the deletion of the word and the above combination from the character string M, and thus updating of the character string M are repeated, the number of words in the character string M gradually decreases.

When, as a result of a decrease in the number of words in the character string M, the controller 31 determines that no word is present in the character string M ("No" in step S213), it terminates the extraction of a word in the character string M and acquires the extracted set of words as a complete set of words contained in the original character string M (step S214).

The controller 31 analyzes the image data in the image memory 26 based on the OCR function to recognize the text TX in the document image and extract a plurality of words constituting the recognized text TX (step S215).

The controller 31 sequentially checks all the words of the character string M acquired in step S214 against the respective words of the text TX extracted in step S215 and determines whether or not all the words of the character string M match the respective words of the text TX (step S216).

When determining that all the words of the character string M match the respective words of the text TX ("Yes" in step S216), the controller 31 approves the copy processing, allows the image data representing the document image to be input from the image memory 26 to the image forming device 12, and allows the image forming device 12 to form the document image on a recording paper sheet (step S217). Unlike the case just described, the character string M does not necessarily contain all the words of the text TX, but may lack at least one word from somewhere in the sequence of words of the text TX. Therefore, so long as all the words of the character string M match the corresponding words of the text TX even if the text TX contains any remaining word not matching the words constituting the character string M, the controller 31 determines that all the words of the character string M match the respective words of the text TX. In other words, the controller 31 determines, on ground that all the words of the character string M are identical with the corresponding words of the text TX, that all the words of the character string M match the text TX.

On the other hand, when determining that all the words of the character string M do not match the words of the text TX ("No" in step S216), the controller 31 allows the display device 21 to display an error message (step S209) and does not allow the copy job to be executed (step S210).

QR codes are widely used and are easily applicable. Therefore, in order to increase the reliability and security of a text in a document image using a QR code, it is necessary to make it difficult to crack information based on a QR code. For example, if a QR code simply represents user's identification information, it cannot ensure the reliability.

Unlike the above, in the above embodiment, the controller 31 sequentially selects symbols or characters constituting an input login password LP, sequentially selects words of a text TX in a document image, inserts, upon each selection of the symbol or character and the word, an underscore and the selected symbol or character between the selected word and the next word to generate a character string M, converts the finally generated character string M to a QR code, and assigns the obtained QR code to the document image.

In executing processing of a document image, the controller 31 detects a QR code assigned to the document image, converts the detected QR code to a character string M, extracts a plurality of words from the character string M based on underscores in the obtained character string and symbols or characters in an input login password, recognizes the text TX in the document image, extracts a plurality of words constituting the text TX, and, upon matching of all the words of the character string M with the corresponding words of the text TX, approves the processing of the document image.

As a result, if the text TX in the document image is falsified (on the assumption that the QR code is not altered), the processing of the document image is not approved. Hence, the text in the document image can be prevented from being falsified and the reliability and security of the text TX in the document image can be increased.

Although in the above embodiment a copy job is illustrated by an example as the processing of a document image, the present disclosure is not limited to the manner described in the above embodiment. For example, the controller 31 may allow or prohibit other jobs, such as facsimile transmission or scanning and transmission of a document image, in the same manner based on a QR code assigned to the document image. In this case, the facsimile communication device 25 is an example of the output device defined in CLAIMS. The network communication device 24 is an example of the image input device and output device defined in CLAIMS.

Although in the above embodiment the controller 31 converts the character string M to a QR code under the restriction of the number n of characters of the character string M to not more than the maximum number N of characters which is the number of characters capable of being converted to a single QR code, the present disclosure is not limited to the manner described in the above embodiment. For example, when the number n of characters of the character string M exceeds the maximum number N of characters, the controller 31 may increase the number of QR codes to two, divide the character string M between the two QR codes, and convert the divided two parts of the character string M to the two QR codes, respectively. Furthermore, each time the number n of characters of the character string M exceeds the integral multiple of the maximum number N of characters, the controller 31 may increase the number of QR codes by one, divide the character string M between QR codes, and convert the divided parts of the character string M to the QR codes, respectively. Thus, all the words constituting a text in a document image can be converted to a plurality of QR codes. The controller 31 assigns these QR codes to the document image. Then, when it comes time to process the document image, the controller 31 extracts the QR codes from the document image, converts the QR codes to a character string M, and checks all the words constituting the text in the document image against the respective words of the character string M.

Although the description in the above embodiment has been given using an image forming apparatus (a multifunction peripheral) as an embodiment according to the present disclosure, the multifunction peripheral is merely illustrative and the image forming apparatus may be a copier, a printer or other types of image forming apparatuses.

The structures, configurations, and processing described in the above embodiment with reference to FIGS. 1 to 6 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
    an image input device through which a document image is input;
    an identification information input device through which identification information consisting of an array of symbols or characters is input;
    a control device including a processor and functioning, through the processor executing a control program, as a controller that, upon input of first identification information through the identification information input device and input of a first document image through the image input device, executes assignment processing for recognizing a first text in the first document image, extracting a plurality of words constituting the first text, sequentially selecting first symbols or first characters from the first identification information in a predetermined first order, sequentially selecting first words from the plurality of words in a predetermined second order, inserting, upon each selection of the first symbol or first character and the first word, a predetermined sign and the first symbol or first character between the first word and the next first word to generate a first character string, converting the first character string to a first 2D barcode, and assigning the first 2D barcode to the first document image; and
    an output device that outputs the first document image assigned the first 2D barcode.

2. The image processing apparatus according to claim 1, wherein the controller restricts a number of characters of the first character string to not more than a predetermined maximum number of characters to be converted to the 2D barcode.

3. The image processing apparatus according to claim 1, wherein the controller makes a cyclically repetitive, sequential selection of the first symbols or first characters from the first identification information.

4. The image processing apparatus according to claim 1, wherein when second identification information is input through the identification information input device and a second document image is input through the image input device, the controller detects a second 2D barcode assigned to the second document image, converts the second 2D barcode to a second character string, sequentially selects second symbols or second characters from the second identification information in the first order, extracts, upon each selection of the second symbol or second character, a second word contained in the second character string based on the sign and the second symbol or second character, recognizes a second text in the second document image, extracts a plurality of words constituting the second text, checks the respective second words contained in the second character string against the plurality of respective words constituting the second text, and approves, upon the respective second words contained in the second character string being identical with the corresponding respective words of the second text, execution of processing of the second document image.

5. The image processing apparatus according to claim 4, wherein the controller approves execution of copy processing or transmission processing of the second document image by the output device as the processing of the second document image.

6. The image processing apparatus according to claim 4, further comprising a display device,
    wherein when the respective second words are non-identical with the respective words of the second text, the controller disapproves the execution of the processing of the second document image and allows the display device to display an error message.

7. The image processing apparatus according to claim 1, wherein
    the image input device inputs the first document image page by page, and
    the controller executes the assignment processing for each page of the first document image.

8. An image processing method comprising the steps of:
    inputting first identification information;
    inputting a first document image;
    recognizing a first text in the first document image and extracting a plurality of words constituting the first text;
    sequentially selecting first symbols or first characters from the first identification information in a predetermined first order, sequentially selecting first words from the plurality of words in a predetermined second order, and inserting, upon each selection of the first symbol or first character and the first word, a predetermined sign and the first symbol or first character be-tween the first word and the next first word to generate a first character string;
    converting the first character string to a first 2D barcode;
    assigning the first 2D barcode to the first document image; and
    outputting the first document image assigned the first 2D barcode.

9. The image processing method according to claim 8, further comprising the steps of:
   inputting second identification information;
   inputting a second document image;
   detecting a second 2D barcode assigned to the second document image;
   converting the second 2D barcode to a second character string;
   sequentially selecting second symbols or second characters from the second identification information in the first order and extracting, upon each selection of the second symbol or second character, a second word contained in the second character string based on the sign and the second symbol or second character;
   recognizing a second text in the second document image and extracting a plurality of words constituting the second text; and
   checking the respective second words contained in the second character string against the plurality of respective words constituting the second text and approving, upon the respective second words contained in the second character string being identical with the corresponding respective words of the second text, execution of processing of the second document image.

* * * * *